United States Patent [19]

Rayburn

[11] 4,215,889
[45] Aug. 5, 1980

[54] LIFTING TOOL

[76] Inventor: Lloyd M. Rayburn, 1643 Rayburn Rd., Ashland, Ky. 41101

[21] Appl. No.: 16,823

[22] Filed: Mar. 2, 1979

[51] Int. Cl.³ .......................... B65G 7/12; B66C 1/44
[52] U.S. Cl. .................................. 294/16; 294/63 B; 294/118
[58] Field of Search ............... 294/16, 28, 31 R, 63 B, 294/106, 117, 118, DIG. 2; 81/341, 405, 407, 408, 416; 224/45 F

[56] References Cited

U.S. PATENT DOCUMENTS

| 900,735 | 10/1908 | Holmberg | 294/118 |
| 969,695 | 9/1910 | Holsey | 294/118 |
| 1,372,278 | 3/1921 | Coleman | 81/407 |
| 3,301,585 | 1/1967 | Johnson | 294/16 |
| 3,367,703 | 2/1968 | Pittis | 294/16 |
| 3,685,097 | 8/1972 | Scott et al. | 81/46 X |

FOREIGN PATENT DOCUMENTS

| 462711 | 7/1928 | Fed. Rep. of Germany | 81/407 |
| 475190 | 4/1929 | Fed. Rep. of Germany | 294/118 |
| 2452781 | 5/1976 | Fed. Rep. of Germany | 294/63 B |

Primary Examiner—Johnny D. Cherry
Attorney, Agent, or Firm—Murray & Whisenhunt

[57] ABSTRACT

Tool for lifting and carrying auto batteries having a scissor-like configuration with an adjustable pivotable connection. Gripping plates positionable in a substantially parallel spaced-apart configuration frictionally grip the side walls of the auto battery. The gripping plates are maintainable in the substantially parallel spaced-apart configuration during adjustment of the pivotable connection allowing good frictional grip as the gripping plates are brought into frictional contact with the side walls of the battery.

13 Claims, 8 Drawing Figures

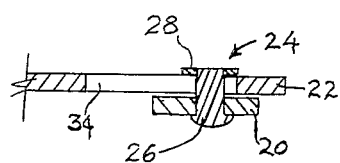
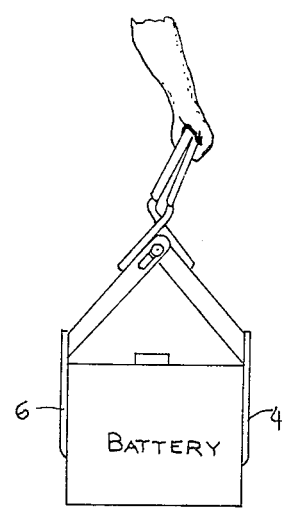
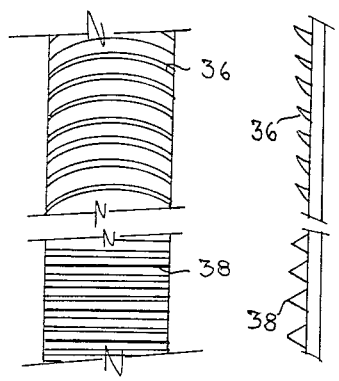
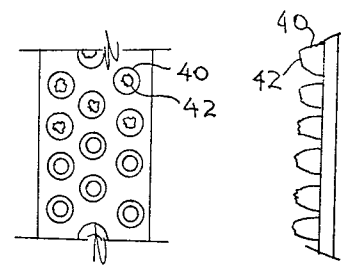
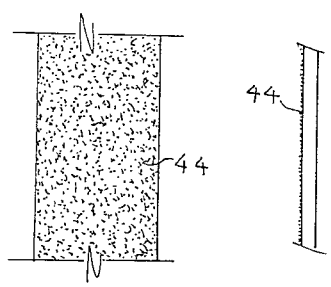
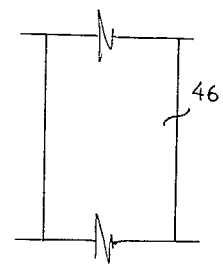

LIFTING TOOL

The present invention relates to a lifting tool suitable for lifting and carrying objects having at least two substantially parallel spaced-apart walls. The tool of the invention is especially suited to lifting and carrying storage batteries, for example automobile and marine batteries.

In view of the preferred application of to tool of the invention, and for convenience of discussion, the following description will be made with reference to automobile batteries. It is to be understood, however, that the tool of the invention has wide applicability to the handling of objects having a shape similar to that of an automobile battery, and the following description with reference to automobile batteries is not intended to be in any way limiting as to the nature of the objects which can be handled by the tool of the invention.

BACKGROUND OF THE INVENTION

It is well known that automobile batteries are difficult to remove from their mounting location within an automobile. This is particularly so with small automobiles which usually have very little room to maneuver in the engine space when the battery is being removed. Difficulties in removing the battery are also experienced when the battery is mounted toward the rear of the engine space where the room to maneuver is reduced even further by the close proximity of the inclined hood. These difficulties are compounded by the significant weight of the battery and the absence of suitable points at which to secure a good manual grip. Thus, when manually removing the battery, it is usually necessary to rock the battery on its mount to enable one hand to be passed along the lower surface of the battery to obtain good grip followed by further rocking to allow the other hand to obtain a similar grip at the other end. Having obtained a suitable grip on the battery, difficulties are often experienced in actually removing the battery from the engine space since it is usually necessary to lean over the engine space, and injury to the hands and knuckles as well as damage to the body of the automobile can occur, as the battery is being removed. In addition to these inconveniences, when the battery being removed is of the "open" type, which requires periodic topping-up with water, there is the ever-present danger of acid spillage during movement of the battery. This danger is not present with those batteries which are of the "closed" type which do not require periodic addition of water, but the above-mentioned difficulties and inconveniences due to the weight of the battery and cramped working conditions are present nevertheless. Similar problems to those described above are equally present when it is desired to install a battery on its mount. In addition, there is difficulty of controlling the placement of the battery on its mount and, if adequate control is not maintained, the battery may fall into the engine space causing damage to the battery and engine components.

To overcome the above problems and disadvantages, many attempts have been made in the past to design battery handling tools for lifting, tilting or maneuvering the battery into and out of its operating position in the automobile. As is well known, most of these tools are designed for use with batteries having the terminal posts positioned on the top horizontal surface of the battery, whereby the tool grips the terminal posts, typically by the use of spring-loaded serrated jaws. Many disadvantages are associated with these pole gripping tools, the main disadvantages being that the terminals are usually damaged when the entire weight of the battery is suspended from the terminals. As a result, it is difficult to establish good electrical contact when the terminal leads are subsequently connected to the posts. In addition, there is the possibility, when the battery is suspended from the terminals, of a terminal post breaking from the battery which not only necessitates repairing the battery, but also possibly results in serious injury to the user. A further disadvantage associated with this type of handling tool is that it is difficult, if not impossible, to maintain good control over movement of the battery or to tilt it relative to the vertical when suspended from the terminal posts. This results in the increased possibility of damaging the battery and the body of the automobile when the battery is being removed or installed.

Another known type of tool for handling batteries, especially those batteries in which the terminals are provided in the sidewalls, is that which grips the vertical side walls of the battery. One example of such a tool is described in U.S. Pat. No. 4,055,364 to Breite. The tool disclosed in this patent comprises two L-shaped levers, one of the levers having an elongate slot permitting adjustment of the tool to accommodate different sized batteries. While this tool operates quite well in practice, there are several noteable disadvantages associated therewith. The first disadvantage is that infinite adjustment of the separation between the gripping surfaces is not possible due to the presence of notches along the upper surface of the elongate slot. This means that if the dimensions of the battery are different from the preset positions of the notches, the battery gripping surfaces will not be parallel to each other when brought into gripping contact with the battery walls, and accordingly the entire gripping surface will not be utilized, thereby reducing the overall gripping power of the device. The second disadvantage associated with this tool is that secure gripping of the battery cannot be achieved as only one of the gripping shoes is provided with an individual handle. The other gripping shoe is fixed parallel to the side of the battery and is not provided with an individual handle. Thus, the gripping force of this shoe is dependent on the inward force created by inward movement of the other shoe as the handle is operated. Accordingly, the overall gripping force of this tool is not very high and this results in an increased chance of the battery slipping while being carried in this tool. A third disadvantage of this tool is that it is somewhat complicated in structure requiring a spring, a special adjustment means along the elongate slot and careful positions of the notches to conform with the dimensions of commercially available batteries.

U.S. Pat. No. 4,032,181 to Money discloses a lifting tool for batteries similar to that in the patent to Breite. The tool described in Money suffers from essentially the same disadvantages discussed above in respect of the Breite tool. The Money tool is provided with only a single handle, and the entire gripping action of the tool is dependent on the combined effect of the movement of the handle away from the tool and spring urging the battery gripping means into gripping contact with the battery. An additional disadvantage associated with the Money tool is that the battery is gripped by elongate hooks and not gripping shoes. Thus, the gripping action of the tool is provided solely by the edge of the hooks.

This results in an increased possibility of the battery slipping from the tool and there is also the possibility of piercing or other damage to the battery caused by the inward pressure of the pointed gripping hooks.

A modern trend in the manufacture of batteries is to fabricate the battery casing from a tough plastic material such as polypropylene. While many advantages are associated with the use of polypropylene instead of metals, principally decreased costs, some weight reduction and fewer corrosion problems, one noteable disadvantage associated with the use of plastic materials such as polypropylene is the low coefficient of friction thereof and the consequent difficulty of securely gripping the walls of the battery. Accordingly, it is important for a battery lifting tool to be able to exert the required gripping force so that the chances of the battery slipping out of the tool are reduced to a minimum. The above-described devices in the patents to Breite and Money have been found to be unsatisfactory in this regard, and their commercial attractiveness has decreased significantly with the increased use of batteries having cases formed from polypropylene and similar plastic materials.

It can be appreciated that a need exists for a battery handling tool which is simple to manufacture, easy to use and readily controllable when the battery is being moved, and which exerts maximum gripping force against the walls of the battery casing so that the user has no fear of the battery slipping from the tool once gripped thereby.

SUMMARY OF THE INVENTION

In accordance with the needs discussed above, there is provided, in accordance with this invention, a tool suitable for lifting and carrying objects having at least two substantially parallel spaced-apart walls, for example, automobile or marine batteries. The tool comprises gripping means for securely gripping the walls of the object. The gripping means include at least two opposed gripping surfaces which are positionable in a substantially parallel spaced-apart configuration. Each of the gripping means are provided with a respective handle means for manual grasping of the tool. The gripping means and respective handle means are connected by lever means, and the lever means are pivotally connected by a pivot means. Slidably connected to the pivot means are adjustment means for slidably adjusting the separation between the at least two gripping surfaces in the substantially parallel spaced-apart configuration. The handle means, lever means, gripping means, pivot means and adjustment means cooperate with each other to cause the gripping surfaces to slidably adjust into the substantially parallel spaced-apart configuration as the gripping surfaces are brought into gripping contact with the walls of the object.

The term "substantially parallel" as noted in this specification and claims, particularly in reference to the gripping surfaces of the tool, is intended to include the situations where the surfaces are strictly parallel to each other, and where they are slightly divergent or convergent with respect to each other. The surfaces may be slightly divergent to each other where the angle between the lever means is from about 1 to 10 degrees, for example, from about 2 to 5 degrees, greater than the angle between the lever means when the gripping surfaces are parallel to each other. The surfaces may be slightly convergent to each other where the angle between the lever means is from about 1 to 10 degrees, for example, 2 to 5 degrees, less than the angle between the lever means when the gripping surfaces are parallel to each other. In this connection, it can be appreciated that some flexing or distortion may occur when the battery is gripped by the tool, especially where the battery case and/or the tool is made from a plastic material, for example polypropylene. When this occurs there will be some departure from the strictly parallel configuration as a firm grip is established.

The tool of the invention overcomes all of the disadvantages noted above in connection with prior lifting tools. Noteably, the facility of slidable adjustment of the separation between the gripping surfaces in the parallel spaced-apart configuration always ensures that the gripping surfaces are substantially parallel to each other when in gripping contact with the walls of the battery. In this way, a maximum gripping effect is achieved by insuring all or substantially all of the gripping surface is in contact with the walls. In addition, the facility of slidable adjustment allows for adjustment of the tool to accommodate any irregularities or asymmetry in the battery casing so that all of the gripping surface is in contact therewith. As a result of the superior gripping effect of the tool of the invention, the user can manipulate the battey without fear of the battery slipping and can maintain closer control over the battery especially during removal from or installation into the automobile. A further advantage of the tool of the invention is that, because of the increased gripping effect, the tool is particularly suited for handling batteries which are fabricated from plastic materials having a low coefficient of friction, for example polypropylene. Most of the batteries currently available are fabricated from such materials which make the tool of the invention extremely attractive from a commercial viewpoint.

Further features and advantages of the tool of the invention will be realized from the following more detailed description of the invention with reference to the accompanying drawings.

BRIEF DESCRIPTION OF THE DRAWINGS

FIG. 3 is a partial cross-section of the tool of FIG. 1 taken along the line 3—3;

FIG. 4 is a side elevation of the device in gripping contact with a battery; and FIGS. 5 through 8 are partial front elevations and side elevations of different gripping surfaces.

SPECIFIC DESCRIPTION OF THE INVENTION

Figure 1:
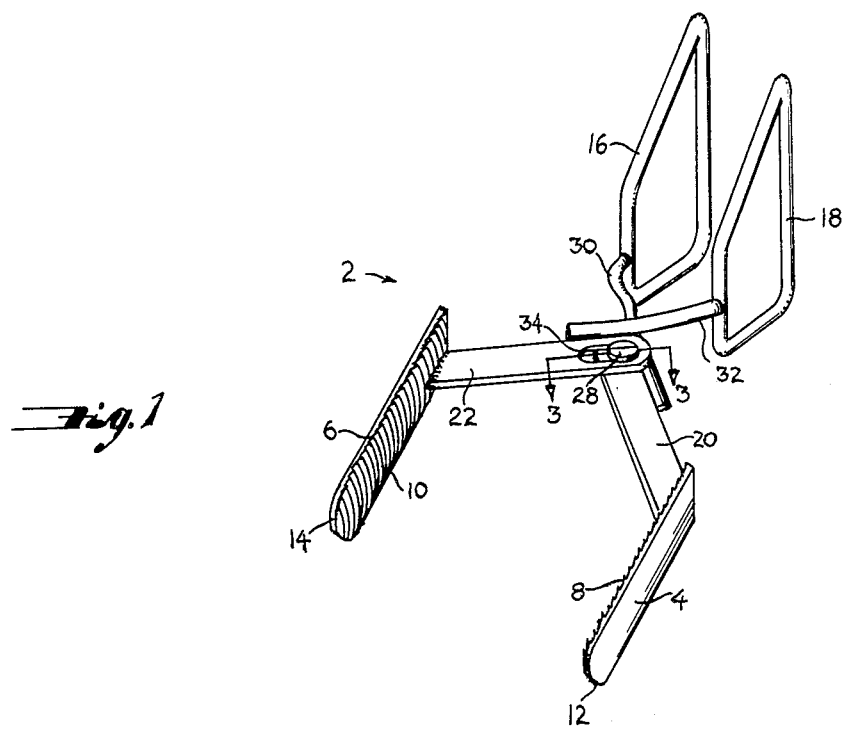
FIG. 1 is a perspective view of the tool of the invention showing the gripping surfaces in substantially parallel spaced-apart configuration.
Figure 2:
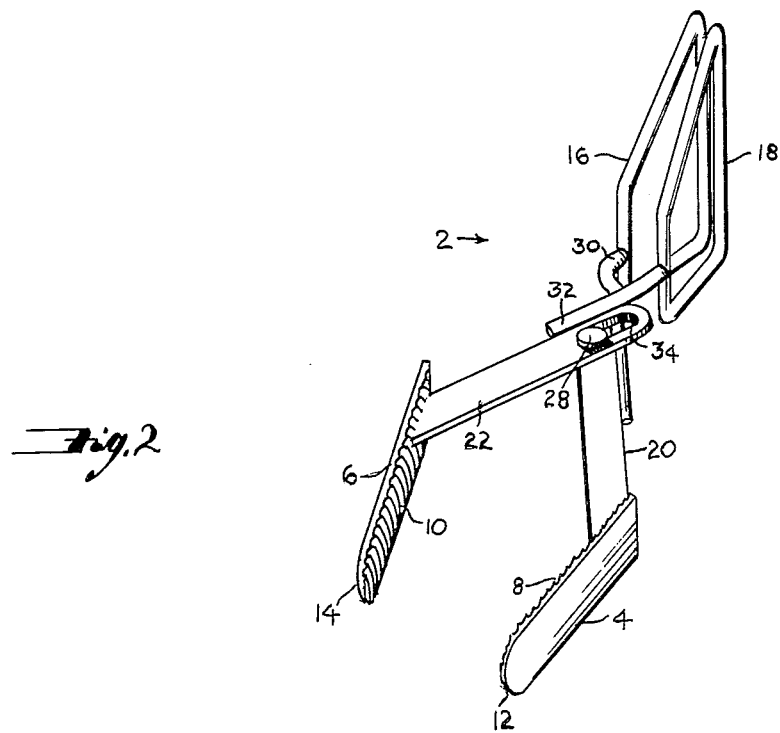
FIG. 2 is a perspective view of the tool of FIG. 1 in "closed" configuration.

Referring to the drawings, the tool of the invention, generally referenced 2, comprises gripping means 4 and 6 provided with gripping surfaces 8 and 10. The nature of the gripping surfaces 8 and 10 will be discussed in more detail below with reference to FIGS. 5 through 8. The gripping means 4 and 6 generally comprise elongate substantially rectangular plate members as shown in FIGS. 1 and 2. The overall dimensions of the plate members will generally depend on the dimensions of the battery to be handled. Thus, the dimensions of the plate members will be larger if the tool is to be used for handling large marine batteries, whereas the plate members will be smaller if the tool is used for handling regular sized automobile batteries. Although not shown in the drawings, it may be possible, if desired, to design the tool such that plate members of different dimensions can be connected to the tool according to the size of the battery to be handled. This may be achieved for example by simply providing for the plate members to be removably secured to respective lever means 20 and 22 for example by using a conventional nut and bolt combination. It will be noted from FIGS. 1 and 2 that the remote ends of the plate members are tapered at 12 and 14, this facilitates placement of the tool over the battery prior to gripping thereof.

The tool 2 is provided with handle means 16 and 18 connected to respective gripping means 4 and 6 by lever means 20 and 22. As seen in FIG. 1, when the gripping means are in spaced-apart substantially parallel configuration, the handle means are also in a substantially parallel spaced-apart configuration. When the handle means are brought toward each other, as shown in FIG. 2, the gripping means 4 and 6 moved from the substantially parallel spaced-apart configuration to a convergent configuration wherein they are facing inward toward each other. Although it is possible for the common plane of the handle means 16 and 18 to be parallel and coincident with the common plane of the gripping means 4 and 6, it is preferred for the common plane of the handle means to be at an angle to the common plane of the gripping means, as seen clearly in FIG. 3. This angle may be for example, about 15 to 45 degrees, such as 20 to 35 degrees, suitably 25 to 30 degrees. One reason for arranging the handle means in a different plane to the gripping means is that the gripping power of the tool is substantially increased over the gripping power when the common planes of the handle means and gripping means are substantially parallel to each other. It has been found that, for example, the gripping power can be reduced by as much as 30 to 60 percent, more usually 40 to 50 percent, when the handle means are moved from a position wherein their common plane is at an angle of 35 to 45 degrees to the common plane of the gripping means to a position wherein these common planes are substantially parallel to each other. Another reason for arranging the handle means and gripping means at an angle as described above is that when the handle means are gripped such that they are inclined away from the body of the user, upon lifting the tool with the battery gripped between the gripping means, the battery tends to swing outward away from the body of the user, thereby facilitating carrying of the battery.

Pivot means 24 pivotally connect the lever means 20 and 22. As shown in FIG. 3, the pivot means 24 consists of a pivot pin 26 having a retaining ring 28 for retaining the lever means 20 and 22 together. It will be appreciated that the retaining ring is not the only means by which it is possible to maintain the lever means together. Thus, although this is not shown, it may be possible to employ a conventional split pin passing through a transverse aperture toward the end of the pivot pin 26.

The handle means 16 and 18 are rigidly connected to the lever means 20 and 22 by rod members 30 and 32. When the lever means and handle means are fabricated from metal, for example cast steel, the rod members are generally welded to the lever means and to the handle means. Alternatively, when the tool is formed from plastic material, for example a rigid thermosetting polymer such as polypropylene, the entire tool can be molded in one or more steps according to conventional techniques. It may optionally be desired to provide for separate attachment of suitable gripping surfaces to the plate members, according to the nature and size of the objects to be handled by the tool. Fabricating the tool from a plastic material not only has the advantages of reducing the weight of the tool as well as its manufacturing cost, but also imparts to the tool a degree of flexibility which enhances the gripping power especially on slightly distorted or irregularly shaped objects.

It will be noted from the drawings that the lever means 20 and 22 are mounted with the respective handle means in cross (scissor-like) configuration. With this arrangement, manual gripping of the handle means 16 and 18 to bring them toward each other causes the plate members 4 and 6 also to move inwardly toward each other and grip the walls of the battery placed between the plate members 4 and 6.

Adjustment means 34 is slidably connected to the pivot means for slidable adjusting the separation between the gripping surfaces 8 and 10. As discussed in more detail below, this slidable adjustment is especially important in permitting the gripping surfaces 8 and 18 to assume a substantially parallel spaced-apart configuration when brought into gripping contact with the walls of the battery. In the embodiment shown in the drawings, an elongate slot 34 is provided in one of the lever means and the pivot means 24 is rigidly mounted on the other lever means. It is equally possible, however, to provide an elongate slot in both lever means and to allow the pivot means 24 to be slidable with respect to both slots while retaining the lever means in pivotably connection. Such an arrangement would allow the gripping surfaces 8 and 10 to be adjusted at a wider separation to allow handling of larger batteries.

FIGS. 5 through 8 illustrate different types of gripping surfaces which can be formed on the plate members 4 and 6. FIG. 5 shows a gripping surface comprising a plurality of sharpened spaced-apart projections extending transversely across the plate member. Projections 36 are formed in parallel arcuate configuration whereas projections 38 extend transversely straight across the plate member. FIG. 6 shows an alternative form of gripping surface wherein individual part-spherical projections 40 are formed on the plate member having roughened outer surfaces 42. FIG. 7 shows a gripping surface comprising granular material 44 adhered to the plate member. Such a gripping surface may be provided, for example, by adhering coarse sandpaper or similar abrasive material to the plate. In FIG. 8, the gripping surface is provided by a block of rubber or other resilient material 46 adhered to the plate member. Although the precise form of the gripping surface is not absolutely critical, it has been found in practice that the gripping surface which is satisfactory for most purposes is that shown in FIG. 5 or FIG. 6.

In use, the tool of the invention is manually grasped by the handle means 16 and 18 and the plate members 4 and 6 are arranged so that they are slightly divergent. The lever means having the elongate slot is moved about the pivot means until the plates 4 and 6 are at their maximum separation (See FIG. 1). The tool is then carefully placed over the battery from which the terminal leads have been disconnected. The handle means 16 and 18 are gripped to draw them toward each other and to bring the gripping surfaces 8 and 10 into grippring contact with the walls of the battery. As this occurs, the pivot pin slides along the elongate slot to permit the gripping surfaces to assume a substantially parallel configuration so that all of the available gripping surface is in contact with the walls of the battery. When the battery has been securely gripped in the tool, the battery can be removed from its mount in a controlled manner to avoid damage to the battery and to the body work of the automobile. When a battery has been removed, it can readily be transported by gripping the tool in one hand such that the battery is urged away from the body of the user and does not come into contact with the legs of the user. During transportation, maximum control can be maintained over the orientation of the battery, thereby facilitating its placement on a workbench or in any other desired location. Installation of a battery in the automobile is also greatly facilitated by using the tool of the invention. With the battery firmly gripped in the tool, it can be lifted over the engine space and carefully lowered with full control into its mounting position. When the battery has been firmly seated, the tool can be very easily removed by simply releasing the grip and lifting the tool away from the battery.

What is claimed is:

1. A tool suitable for lifting and carrying an auto battery having at least two substantially parallel spaced-apart side walls comprising:
   (a) gripping means for frictionally gripping said side walls of said auto battery, said gripping means including at least two opposed gripping surfaces positionable in a substantially parallel spaced-apart configuration in which configuration said opposed gripping surfaces are spaced-apart by a distance greater than the width of said auto battery, said auto battery being receivable between said opposed gripping surfaces;
   (b) handle means for manually grasping said tool, each of said gripping means having a respective handle means connected therewith;
   (c) lever means for connecting said gripping means with said handle means;
   (d) pivot means for pivotally connecting said lever means;
   (e) adjustment means slidably connected to said pivot means for slidably adjusting the separation between said at least two gripping surfaces, said at least two gripping surfaces being maintainable in substantially parallel spaced-apart configuration during said adjustment, said handle means, lever means, gripping means, pivot means, and adjustment means cooperating to cause said gripping surfaces to adjust into a substantially parallel spaced-apart configuration as said gripping surfaces are brought into frictional gripping contact with the side walls of said auto battery.

2. A tool according to claim 1 wherein said pivot means includes a pivot pin mounted substantially at right angles to said lever means.

3. A tool according to claim 2 wherein said adjustment means includes an elongate slot provided in at least one of said lever means, said pivot pin being slidably engageable in said elongate slot whereby said at least one lever means is longitudinally slidable about said pivot pin.

4. A tool according to claim 1 wherein said lever means are pivotally mounted on said pivot means in cross scissor-like arrangement whereby said gripping surfaces are disposed on one side of said pivot means and said handle means are disposed on the other side of said pivot means.

5. A tool according to claim 1 wherein said gripping means includes at least two opposed elongate substantially rectangular plate members respectively mounted near one end thereof to said lever means.

6. A tool according to claim 5 wherein said plate members are provided with convergent tapered end portions remote from said end mounted to said lever means.

7. A tool according to claim 1 wherein said at least two gripping surfaces comprise a plurality of sharpened spaced-apart projections extending transversely across said gripping means.

8. A tool according to claim 7 wherein said sharpened spaced apart projections extend across said gripping means in an arcuate configuration.

9. A tool according to claim 1 wherein said gripping surfaces are comprised of a plurality of roughened spaced-apart part sphercial projections.

10. A tool according to claim 1 wherein said handle means are mounted in a plane which is at an angle to a parallel plane of said gripping surfaces 11. A tool according to claim 10 wherein said angle is from about 20 degrees to 45 degrees.

12. A tool according to claim 1 fabricated from steel.

13. A tool according to claim 1 fabricated from a resilient plastic material.

* * * * *